Dec. 7, 1965 R. J. HAMORY 3,221,459
MOLDED BLOCKS AND LOAD-BEARING WALLS CONSTRUCTED THEREOF
Original Filed July 6, 1960 5 Sheets-Sheet 1
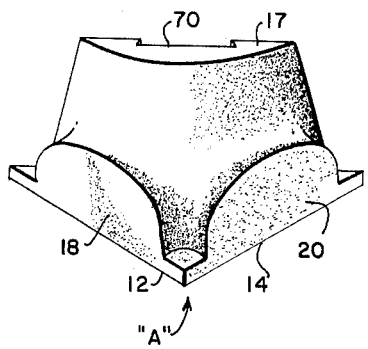
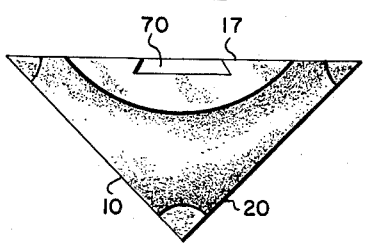
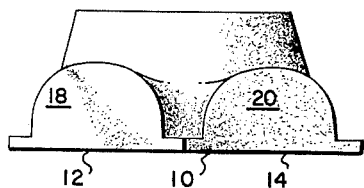
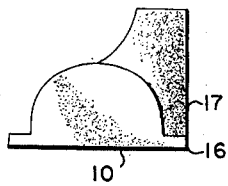
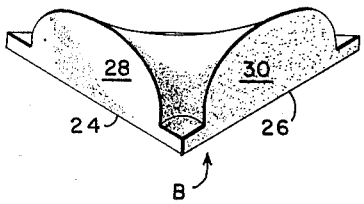
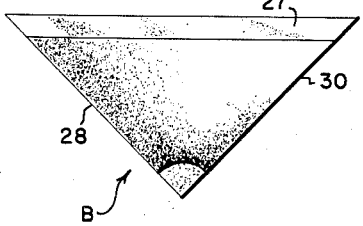
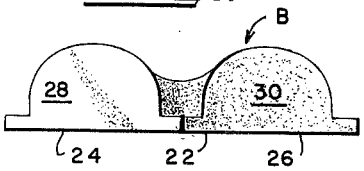
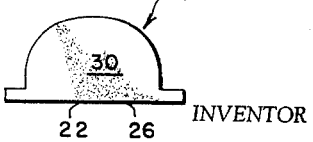
INVENTOR
ROBERT J. HAMORY
BY Dean Lawrence
ATTORNEY Dec. 7, 1965  R. J. HAMORY  3,221,459
MOLDED BLOCKS AND LOAD-BEARING WALLS CONSTRUCTED THEREOF
Original Filed July 6, 1960  5 Sheets-Sheet 2 aa ba bb ca cc cb

INVENTOR
ROBERT J. HAMORY

BY Dean Lawrence
ATTORNEY

Dec. 7, 1965 R. J. HAMORY 3,221,459
MOLDED BLOCKS AND LOAD-BEARING WALLS CONSTRUCTED THEREOF
Original Filed July 6, 1960 5 Sheets-Sheet 3
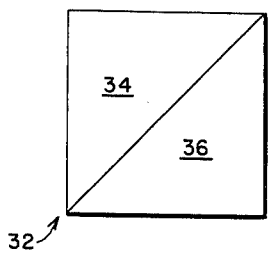
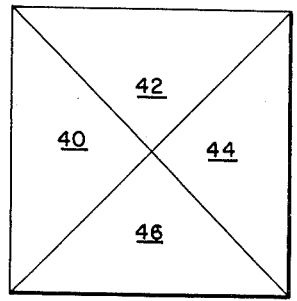
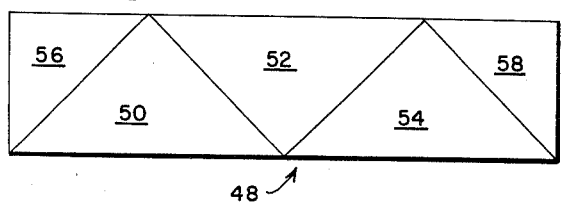
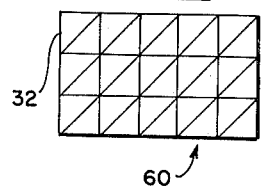
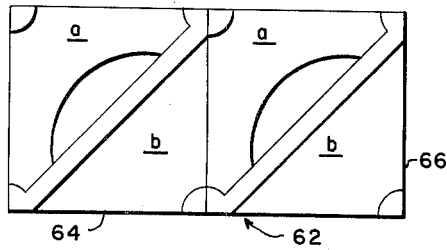
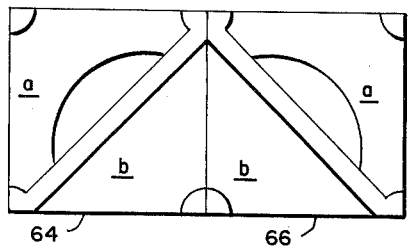
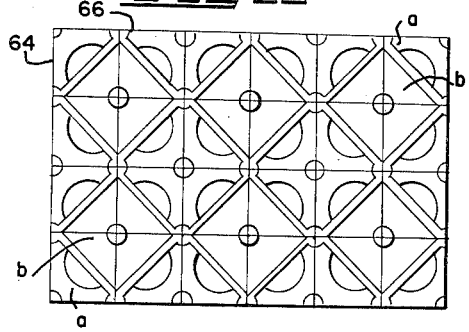
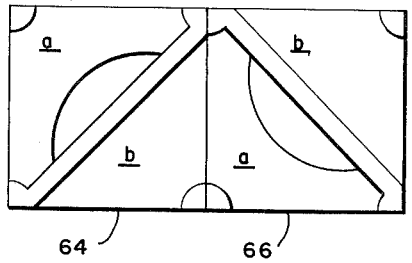
INVENTOR
ROBERT J. HAMORY
BY Dean Laurence
ATTORNEY

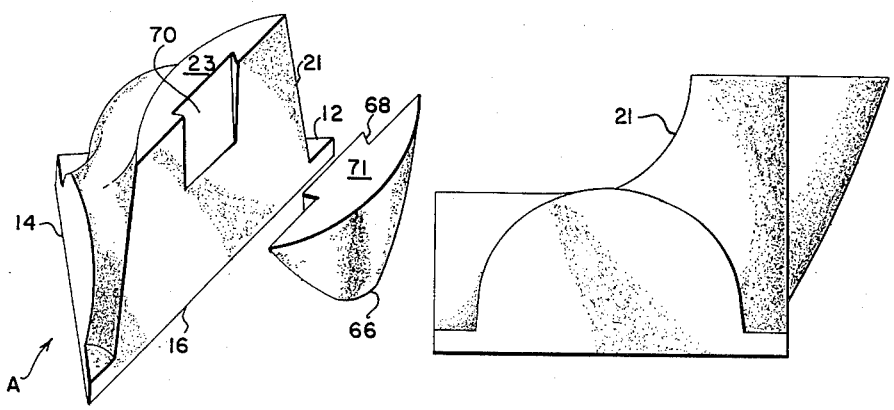
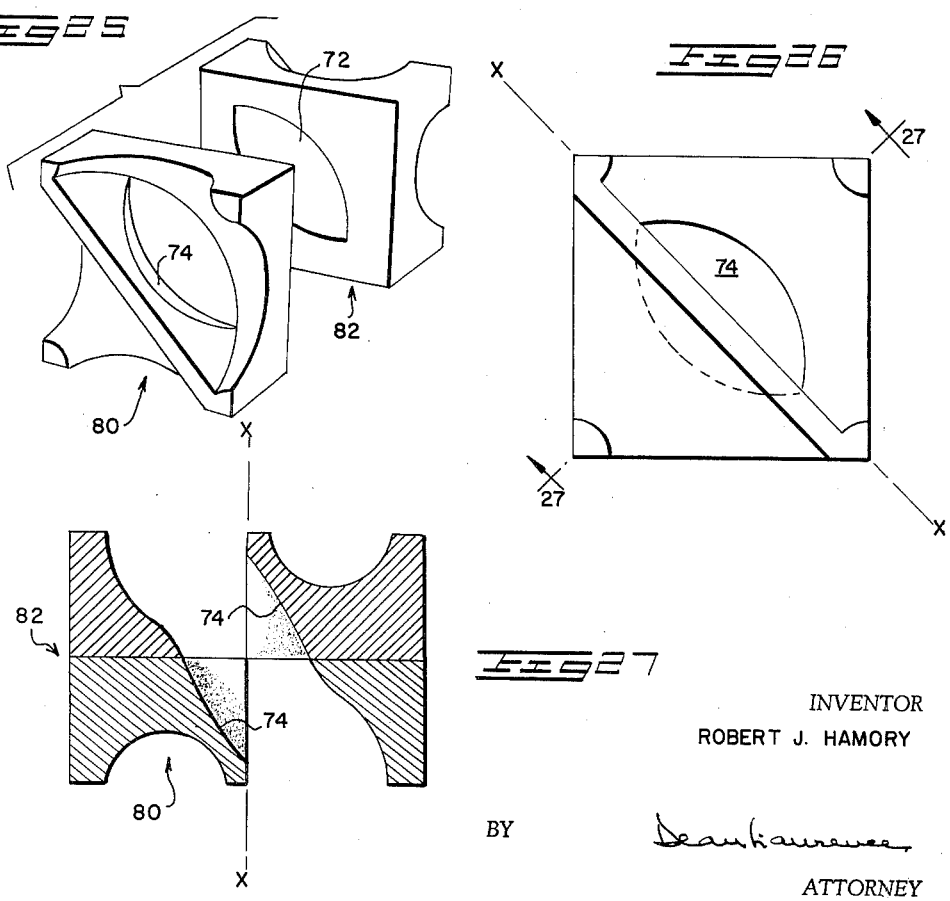

Dec. 7, 1965 R. J. HAMORY 3,221,459
MOLDED BLOCKS AND LOAD-BEARING WALLS CONSTRUCTED THEREOF
Original Filed July 6, 1960 5 Sheets-Sheet 5

INVENTOR
ROBERT J. HAMORY

BY

ATTORNEY

United States Patent Office 3,221,459
Patented Dec. 7, 1965

3,221,459
MOLDED BLOCKS AND LOAD-BEARING WALLS CONSTRUCTED THEREOF
Robert J. Hamory, San Juan, Puerto Rico
Original application July 6, 1960, Ser. No. 41,097. Divided and this application Nov. 13, 1962, Ser. No. 243,692
1 Claim. (Cl. 52—606)

This invention relates to molded blocks and load-bearing walls constructed thereof, and this application is a division of my copending application Serial No. 41,097 filed July 6, 1960, now abandoned, entitled Method and Apparatus for Molding Block or Panel Members and Block or Panels Molded Thereby.

The molding method and apparatus of the invention and the blocks or panels produced by the method and apparatus may be used in the construction of load-bearing walls, screen walls, or in any other building installation or field of utilization in which molded block or panel members may be used. Furthermore, the method and apparatus of the invention and the molded blocks or panels produced thereby may be used with any plastic molding material, such as concrete, plaster of paris, ceramic material, foaming plastics, or any other material capable of being cast or pressed into a mold. While in the preferred embodiment of the invention to be described, three-dimensional molding core units are arranged in a predetermined geometrical relation within a molding frame, and plastic material is molded or cast about the core units, it is within the contemplation of the invention that three dimensional core units arranged in predetermined geometrical relation be pressed into a body of plastic material to produce a sculptured effect on the body of plastic material.

It is an object of this invention to provide a method and apparatus for producing molded blocks or panels which permit great versatility and flexibility in the block or panel configurations and combinations.

It is another object of the invention to provide a block or panel molding method and apparatus and molded blocks or panels produced thereby which permits several basic block forms to be combined and arranged in a great number of combinations and configurations.

It is still another object of the invention to provide a molded block or panel construction suitable for use in load-bearing walls or screen walls.

It is still another object of the invention to provide a method and apparatus for molding blocks or panels and the blocks or panels produced thereby which permits controlled passage of light and air through a wall formed by the molded blocks or panels.

Still another object of the invention is to provide a method and apparatus for producing molded blocks or panels, and the molded blocks or panels produced thereby, in accordance with which the blocks or panels are molded so as to admit light and air while at the same time insuring privacy to the occupants of the premises by interrupting the line of sight through the air and light admitting passages.

A further object of the invention is to provide a method and apparatus for molding blocks and the blocks produced thereby which permits the blocks to have contours which may be oriented in a wall structure so as to shed angular precipitation while admitting light and air, or so as to admit direct sunlight during specific hours of the day and seasons of the year.

Still a further object of the invention is to provide building blocks or panels which may be combined with a suitable backing such as screen cloth or glass to control passage of air through the block wall and/or to provide predetermined decorative effects.

In achievement of these objectives, there are provided in accordance with an embodiment of this invention a method and apparatus for molding blocks of plastic material, employing two basic molding core units having contours which are three-dimensional negatives of the contours desired on the finished block surface, and having base perimeters of right triangle shape which permit even-numbered multiples of the molding core units to be assembled together in a molding frame to form a great variety of composite molding cores for molding a block or panel of predetermined size. An important feature of the construction of the basic right-triangle-shaped molding core units is that each of the two short sides has a side wall contour and area extending perpendicularly to the plane of the base of the respective core unit which is identical to the short side wall surface contour and area of the other short side wall of the same block and also of the corresponding side walls of the other basic molding core units or units which form part of the same composite molding core. Two right triangle molding core units may be arranged to form a square module with their respective hypotenuses in abutting relation with each other, or, alternatively, four right triangular molding core units may be assembled to form a large square module having an area equal to four of the right triangle molding core units, the hypotenuse of each right triangle forming one side of the large square. The right triangular core units may also be assembled into a rectangular composite core configuration. The identical surface configuration of the corresponding short side walls of each of the right triangular molding core units permits the modules assembled from the core units to mate with other corresponding adjacent modules in the same molding frame with a smooth surface transition from one module to another, and permits the adjacent edges of adjacent modules in a molding frame to be relatively rotated while still maintaining a smooth surface transition to thereby permit great versatility and flexibility in the configurations of the composite blocks formed from the plurality of modular core members in a given molding frame.

Further objects and advantages will become apparent from the following description taken in conjunction with the accompanying drawings in which FIG. 1 is a perspective view of one of the basic molding core units which may be used in the method and apparatus of the invention, and which will be referred to for convenience in the specification as the "A" core unit;

FIG. 2 is a top plan view of the core of FIG. 1;

FIG. 3 is an elevation view of the core of FIG. 1, looking inwardly at the right angle corner formed by the two short sides of the core;

FIG. 4 is a side elevation view of the core of FIG. 1, with the core turned through a 90 degree angle in the same plane as FIG. 3;

FIG. 5 is a perspective view of another basic right triangular molding core unit which is used in conjunction with the core unit of FIGS. 1–4;

FIG. 6 is a top plan view of the core unit of FIG. 5;

FIG. 7 is an elevation view of the core unit of FIGS. 5 and 6, looking inwardly at the right triangle corner of the core;

FIG. 8 is an elevation view of the core of FIGS. 5, 6, 7, with the core rotated through an angle of 90 degrees from the position of FIG. 7, but with its base lying in the same plane as in the view of FIG. 7;

FIG. 15 is a diagrammatic representation of a module formed by joining two right triangle core units together to form a small square;

FIG. 16 is a diagrammatic view of a module which may be formed by assembling four right triangle core units together;

FIG. 17 is diagrammatic view of a plurality of molding core units assembled to form a rectangular module;

FIG. 18 is a diagrammatic view showing one possible assembly of a plurality of modules which may be used to form a large composite block or panel;

FIG. 19 shows a block formed of two of the A–B modules shown in FIG. 10 molded in side-by-side relation to form a composite block;

FIG. 20 is the same combination of modules shown in FIG. 19, but with the right-hand module, with respect to the view shown in FIGS. 19 and 20, rotated through an angle of 90 degrees with respect to its position in the view of FIG. 19;

Figure 28:
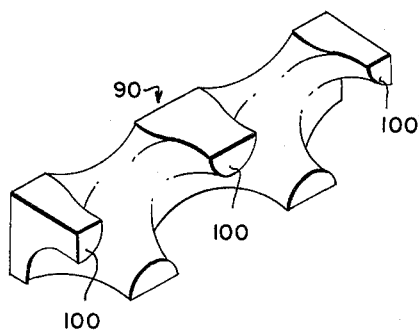
Figure 29:
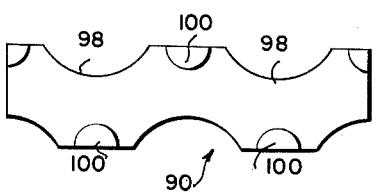
Figure 31:
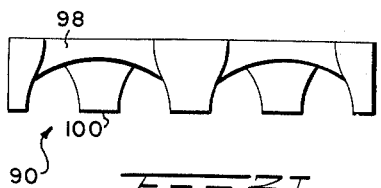
Figure 30:
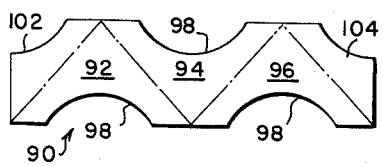
Figure 32:
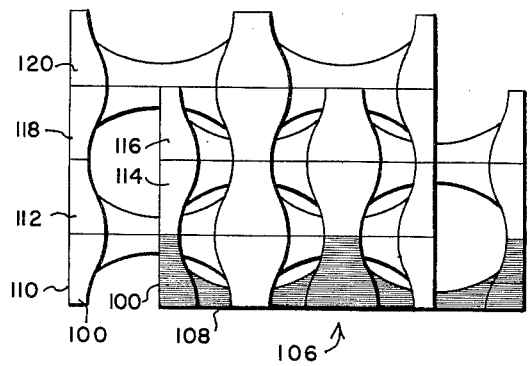
Figure 33:
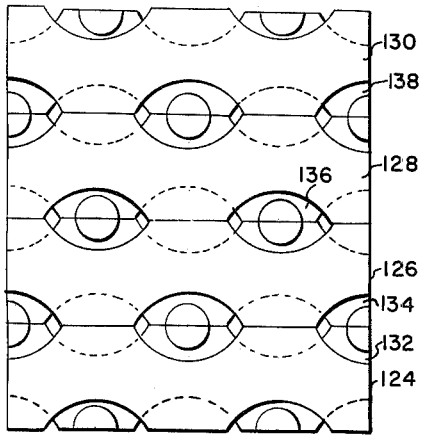

FIG. 21 is the same combination of modules or half block units as in FIGS. 19 and 20, but with the right-hand module rotated 270 degrees from its position in FIG. 19, and 180 degrees from its position in FIG. 20;

FIG. 22 is a diagrammatic representation showing how a plurality of the block units such as those in FIGS. 19, 20, and 21 may be used in assembling a section of a wall;

FIG. 23 shows the A core unit of FIGS. 1–4, inclusive, including a detachable plug core element which projects into the molding region of an adjacent "B" core unit to produce an opening in the base of the molded "B" unit which cooperates with a similar opening defined by the shape of the "A" core unit to form an elliptical-shaped opening in the base of the resultant BA module;

FIG. 24 is an elevation view of the core unit of FIG. 23 showing the plug unit in position;

FIG. 25 is an exploded perspective view of two BA molded modules or half block units positioned in back-to-back relation to each other, in such manner that the openings in the respective blocks cooperate to form an angle of eclipse which permits the passage of air and light but prevents a direct line of sight through the openings in a plane perpendicular to the surface of the wall, thereby assuring privacy to the occupants of the premises;

FIG. 26 is an elevation view of the two blocks of FIG. 25 in back-to-back assembled relation with respect to each other;

FIG. 27 is a view in section along line 27—27 of FIG. 26;

FIG. 28 is a perspective view of a modified type of block unit formed from a plurality of "A" core units, such as that shown in FIGS. 1–4; assembled as diagrammed in FIG. 17;

FIG. 29 is an elevation view of the modified block construction shown in FIG. 28;

FIG. 30 is a view of the block assembly of FIGS. 28 and 29 lying in the same plane as shown in FIGS. 28 and 29, but viewed from the opposite surface thereof;

FIG. 31 is an elevation view of the block assembly of FIGS. 28 and 29 rotated about a horizontal axis through an angle of 90 degrees from the plane in which it lies in FIGS. 28, 29 and 30;

FIG. 32 is a vertical elevation view of one form of wall construction which may be obtained using the block assemblies of FIGS. 28–31, inclusive; while FIG. 33 is a vertical elevation view of still another modified type of wall construction which may be obtained using the block assemblies of FIGS. 28–31, inclusive.

Referring now to the drawings, and more particularly to FIGS. 1–8, there are provided in accordance with an embodiment of the invention two basic molding core units A and B which are three dimensional negatives of the contours which it is desired to have in the molded blocks, and each having a flat base of right-triangular-shaped perimeter, which permits the two basic core units to be assembled together to define a square-shaped composite mold form or module, or permitting four of the basic right triangle core units to be assembled to define a large square module. In the illustrated embodiment, core unit A produces an open arched block section, while core unit B produces a contoured solid section.

The basic core unit A shown in FIGS. 1–4 includes a flat base 10 having a perimeter in the form of a right triangle, including two short side edges 12 and 14 of equal length extending at an angle of 90 degrees with respect to each other in the plane of base 10, and joined by a hypotenuse edge 16 which is at an angle of 45 degrees with respect to each of the side edges 12 and 14 in the plane of base 10.

Extending upwardly from each of the respective short side edges 12 and 14 in a plane perpendicular to the plane of the base are the side wall surfaces 18 and 20 each having the identical contour as the other and as the corresponding perpendicular side wall surfaces of the other core unit B to be described. The core unit A also includes a vertical wall surface 17 extending upwardly from the hypotenuse edge 16 of the base perimeter.

The core unit B, like the core unit A, includes a flat base 22 of right triangular perimeter and including two short side edges 24 and 26 of equal length extending at an angle of 90 degrees with respect to each other in the plane of base 22, and a long side edge or hypotenuse 27 which forms an angle of 45 degrees with each of the side edges 24 and 26 of the base perimeter. Extending upwardly from each of the respective short side edges 24 and 26 in a plane perpendicular to the plane of the base are the side wall surfaces 28 and 30, each having the identical contour as the other and as the corresponding perpendicular side wall surfaces 18 and 20 of core unit A previously described. Thus, the surface areas 18, 20, 28 and 30 of the two core units A and B are of identical shape and area so that, as will be explained hereinafter, any of these various short sides of the core units A and B may be positioned in abutting relation with each other in a molding form to produce a perfect mating between any of the short sides of the two core units A and B, or any combination thereof, regardless of which short side of one core unit is disposed adjacent which short side of the other core unit.

The fact that the wall surfaces of the short sides of the core units A and B which lie perpendicular to the plane of the base of the core units are all of identical shape and area permits the blocks or panels to be molded from a plurality of right triangle A and B core units arranged to form small square modules, large square modules, or rectangular modules, with the identical contours and areas of the short side walls of the core units permitting the modules to be arranged in a great number of combinations and configurations due to the identical surface shape of the short side walls.

Figure 9:
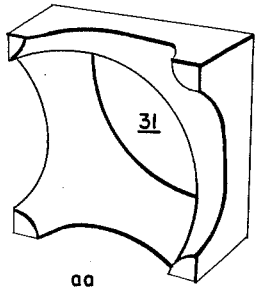
FIG. 9 is a square module molded by using two of the "A" core molding units shown in FIGS. 1–4.
Figure 10:
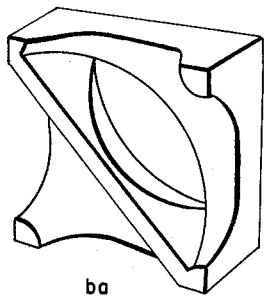
FIG. 10 is a square module molded by using one of the "A" core units of FIGS. 1–4 and one of the "B" core units of FIGS. 5–8.
Figure 11:
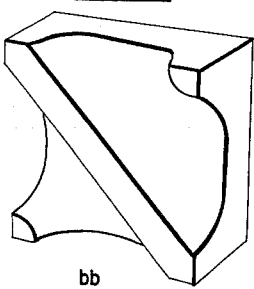
FIG. 11 is a square module formed by using two of the "B" core units shown in FIGS. 5–8.
Figure 12:
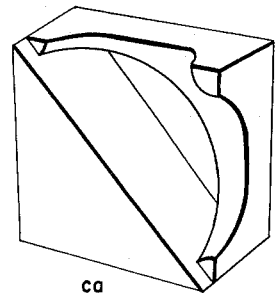
FIG. 12 is a square module formed by using one of the "A" core units of FIGS. 1–4 with the other half of the module being formed as a solid section by the absence of a core unit.

As shown in FIGS. 9–14, six basic small square modules may be molded or cast, using two of the basic right triangle-shape core units A and B shown in FIGS. 1–8, together with a further variation introduced by the complete absence of a negative core, which is designated by the letter C. Thus, in FIG. 9, there is shown a block designated as *aa* which is molded using two of the A core units assembled with their respective hypotenuses in abutting relation to form a square module. FIG. 10 shows the block designated as *ba* and formed by using an A and a B core unit plus a plug (FIG. 23, 24) assembled together to form a square module. FIG. 11 shows a block designated as *bb*, formed by molding plastic material about two B core units positioned in assembled relation to form a square module. FIG. 12 shows a square block module designated as *ca* formed by molding or casting plastic material into a form containing only a single A core, with the other half of the square being devoid of a negative core unit but merely including void space which is filled by the plastic material.

Figure 13:
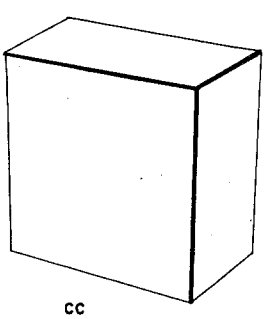
FIG. 13 is a module formed entirely as a flat solid section.

FIG. 13 shows a square block designated as *cc* formed by casting or molding the plastic material into a space devoid of either A or B negative core units.

Figure 14:
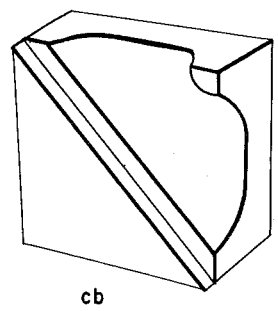
FIG. 14 is a module formed using a "B" core unit as shown in FIGS. 5–8, with the other half of the module being formed as a solid section by the absence of a core unit.

FIG. 14 shows a square block module designated as *cb* which is formed by molding or casting plastic material about a B core unit occupying one-half the square, while the other half of the square is devoid of a negative core unit, but merely is void space filled entirely with the molded material.

FIGS. 15, 16 and 17 illustrate diagrammatically several basic modules which may be formed from the two basic right triangle molding core units. In FIG. 15, there is shown a square generally indicated at 32 formed of two right triangles 34 and 36, which together form a square. The square modules shown in FIGS. 9–14 are of the type shown diagrammatically in FIG. 15. FIG. 16 shows a module indicated generally at 38 and formed of four right triangular molding core units 40, 42, 44 and 46. Still another module is shown in FIG. 17 in which the module is of elongated rectangular shape designated generally at 48, and including right triangle core units 50, 52, and 54 of equal size base perimeters. The rectangular shape of the module 48 is completed by the addition of two small core units 56 and 58, respectively, at the opposite ends of the core unit. The right-triangular-shaped core units 56 and 58 are of half the base area of any one of the right triangles 50, 52 and 54.

Any of the modules generally indicated at 32, 38 or 48 shown in FIGS. 15, 16, 17, respectively, may be duplicated any number of times in a molding frame, to produce a resultant molded block or panel which may be a repetition of any desired number of the basic modules. The number of basic modules contained in a single casting or molding is determined principally by the requirements of the construction project for which the blocks are intended, and the facilities for installation and handling of the molded blocks. Where facilities are available for handling the molded blocks by mechanical lifting devices, obviously a greater number of modules may be included in a given casting or molding than where the molded blocks must be handled and positioned manually.

In FIG. 18 there is shown diagrammatically a molded panel generally indicated at 60 formed of a plurality of modules such as the module 32, for example, shown in FIG. 15, positioned in side-by-side relation in a single molding frame to produce a composite panel molded as a single integral block and formed of fifteen of the modules 32. In a similar manner, a composite molding could be cast from the plurality of the modules 38 or 48 in FIGS. 16 and 17. A preferred method of molding block units using modules formed of the two basic core units A and B is to mold blocks formed of two modules such as 32 in a single frame, with each module forming half of the finished molded block, to form a resultant block such as that indicated at 62 in FIG. 19, formed of any two of the modules shown in FIGS. 9, 10, 11, 12, 13, and 14, in any desired combination. Thus, the blocks shown in FIGS. 19, 20, and 21 are formed of two identical BA modules cast in side-by-side relation into a composite block. To distinguish the two modules of FIGS. 19, 20, and 21 from each other, separate reference numerals will be applied, the module at the left-hand side with respect to FIGS. 19, 20, 21 being indicated as 64 and the module at the right-hand side being indicated as 66.

The transition between FIGS. 19, 20 and 21 illustrates the manner in which the identical wall surfaces on the short sides of the right triangle core units makes possible various combinations of positions of the modules within a given composite block. Thus, in FIG. 19, the two modules 64 and 66, each of which is a BA module, are oriented in the same relative position. In FIG. 20, module 66 has been rotated through an angle of 90 degrees in the same plane with respect to its position in FIG. 19, while in FIG. 21, module 66 has been rotated through 180 degrees in the same plane with respect to its position in FIG. 20 and through 270 degrees with respect to its position in FIG. 19. Module 64 remains in the same relative position in all three figures. This rotation of the half-block modules 64 and 66 with respect to each other is made possible by the fact that, as previously explained, the vertical side walls 18, 20, 28, and 30 of the two basic core units A and B are of identical surface area and shape, so that the modules may be rotated as just described while still maintaining a smooth surface transition from one module to another.

There is shown in FIGS. 23 and 24 slightly modified A core unit which is similar to that shown in FIGS. 1–4 except that it has a detachable plug unit which is keyed to a slot in the A core so as to project into the molding region of an adjacent B core unit to produce a tapered semi-elliptical opening in the portion of the molding produced by the B core unit. The plug may also be used when the A core unit is used in conjunction with a C molding (complete absence of a negative mold, and comprising merely void space). The A mold shown in FIGS. 23 and 24, like the A mold shown in FIGS. 1–4, includes a column-like portion 21 which has a semi-elliptical surface 23 at the upper end thereof parallel to the plane of the base, which defines the shape of the semi-elliptical opening defined by the A core unit in an *a* block section. Thus, when two A core molding units are assembled together to form an *aa* module as shown in FIG. 9, the resultant molded product includes a substantially elliptical opening in the main surface thereof (see 31, FIG. 9), formed by the composite action of the two semi-elliptical surfaces 23 defined by the respective A core units.

However, when an A core unit is assembled adjacent a B core unit, or in conjunction with a C mold unit (void mold space), it is desirable that a semi-elliptical opening be provided in the adjacent B or C section of the module to admit light and air. For this purpose, the plug 66 shown in FIG. 23 is provided which includes a key 68 adapted to be received in a slot 70 in the wall surface 25 of the A core unit which extends above the hypotenuse of the base perimeter. Thus, plug 66 may be detachably engaged with the A core unit when it is desired to assemble the A core unit in a frame adjacent a B unit for molding a BA module. Plug 66 has a top surface portion 71 of semi-elliptical shape and lying in the same plane as the semi-elliptical top surface 23 of core unit A of FIG. 23, the body of the plug converging downwardly toward the surface 25 of core unit A in accordance with the shape of the opening to be produced in the adjacent B section of the molded block. The use of the plug 66 in conjunction with the A core unit produces an elliptical opening such as that indicated at 72 in the rear surface in the BA module shown in FIG. 25, the inwardly tapering contour of the plug 66 in the mold unit producing a corresponding inward tapering of the surface of the opening in the *b* portion of the *ba* block module as indicated by the curved surface area 74 in FIGS. 25 and 27. FIGS. 25 and 27 illustrate two *ba* modules in back-to-back relation.

FIGURES 25, 26, and 27, taken together, illustrate an arrangement of blocks molded from BA core modules which may be used to permit passage of light and air through a wall constructed of such blocks, while at the same time insuring privacy to the occupants of the premises by interrupting the line of sight through the air- and light-admitting passages. Thus, FIGURE 25 shows a pair of *ba* half-block units respectively indicated at 80 and 82 which are molded using the A core unit of FIGURES 1–4 and the B core unit of FIGURES 5–8, inclusive, plus the plug 68 (FIGURE 23). Each of the blocks 80 and 82 is of identical shape and configuration. When the respective blocks 80 and 82 are positioned in back-to-back relation as shown in FIGURES 25, 26, 27 in such manner that the inwardly tapered elliptical surfaces 74 in the *b* section of each of the respective *ba* modular blocks 80 and 82 lies on the opposite side of the diagonal axis XX from the corresponding surface 74 of the other block with which it is in back-to-back relation, the blocks 80 and 82 cooperate to form an "angle of eclipse" which prevents a direct line of sight through the passages in the blocks in a plane perpendicular to the surface of the blocks and yet at the same time admit light and air to the interior of the premises. This feature insures privacy to the occupants of the premises.

There is shown in FIGURES 28, 29, 30 and 31 a modified type of molded block module formed only from an assembly of the "A" right triangle core units, the block module so produced being generally indicated at 90. The block module 90 is formed by assembling a plurality of A core elements such as that shown in FIGURES 1–4 in a molding frame in longitudinal juxtaposition in such manner that the short legs of the respective A core units are in abutting relation to each other in the molding frame, while the longer hypotenuse sides of the A core units define the opposite longitudinal edges of the module. Thus, the portions 92, 94, 96 indicated in dotted line in FIGURE 30 are molded from three A core elements positioned in a longitudinal row in such manner that the hypotenuse edges of the adjacent abutting core units A lie along alternately opposite longitudinal edges of the molded form. The solid pillar portion 21 of the A core unit, best seen in FIGURE 23, which terminates at the upper surface thereof in the semi-elliptical surface 23, results in the open arched portions indicated at 98 in the molded block, while the vertical posts 100 in the molded block are produced from corresponding negative surface regions in the A core units.

As best seen in FIGURE 30, the ends of module 90 are formed from a small right triangle core having a shape corresponding to that formed by bisecting a 90 degree right triangle A core unit into two 45 degree core units by bisecting line extending from the right angle corner of the right triangle core unit A, to the center of the hypotenuse.

There is shown in FIGURE 32 one type of wall construction which may be obtained using modules of the type such as the block module 90. A plurality of block modules 90 may be interlaced with each other in the manner shown in FIGURE 32 by arranging a plurality of rows of the modules 90 in such manner that adjacent rows of the modules have their posts facing in opposite directions, so that the posts 100 of one row interlace with the arch-shaped recesses 98 of the adjacent row, the posts 100 and arched recesses 98 being so dimensioned and proportioned as to permit such interlacing.

Thus, for example, the vertical wall construction generally indicated at 106 in FIGURE 32, includes a plurality of modular blocks 90 respectively indicated at 108, 110, 112, 114, 116, 118, and 120. The two bottom blocks 108 and 110 lie in the same horizontal plane as each other, but the posts 100 of the bottom block 108 extend upwardly into the arched recesses 98 of the block 110, while the posts 100 of the block 110 extend downwardly into the arched recesses of the block 108. In a similar manner, the blocks 112 and 114 lie in the same horizontal plane as each other directly above the plane of blocks 108 and 110, with the posts 100 of block 112 projecting upwardly into the arched recesses of block 114, while the posts 100 of block 114 project downwardly into the arched recesses of block 112 to touch the posts 100 rising from block 108 at the same horizontal plane as that which is between blocks 112 and 110.

FIGURE 33 shows another variation of wall construction which may be obtained using the modules 90, this variation being fundamentally similar to that shown in FIGURE 32. In the embodiment of FIGURE 33, a first course of modular blocks 90 are assembled in vertically superposed relation to each other in rows 124, 126, 128, and 130, the blocks in each row being rotated through an angle of 90 degrees about a horizontal axis with respect to the position of the modules 90 in FIGURE 32. The posts 100 of the respective blocks 90 of the rows 124, 126, 128, and 130 all face inwardly away from the plane of the paper. A second course of modular blocks 90 formed of vertically superposed rows 132, 134, 136 and 138 lies behind the course formed of the blocks 124, 126, 128 and 130. The blocks of the second course formed by rows 132, 134, 136 and 138 have their posts 100 facing into the plane of the paper in such manner as to be received into the arched recesses 98 of the first course formed by the blocks 124, 126, 128, and 130.

In building walls of the molded blocks or panels hereinbefore described, blocks such as those of the *ba* type may be oriented in the wall structure in such way as to shed angular precipitation while admitting light and air. Thus, for example, the *ba* module 66 shown in FIGURE 21 if arranged in vertical elevation in a wall as shown in the view of FIGURE 21 would admit light and air but would shed precipitation due to the position of the *b* portion of the module vertically above the *a* portion thereof, and also due to the contour of the *b* portion of the module which is such as to provide drainage away from the *a* portion of the module when the module is oriented as just described. Also, varying degrees of light may be admitted through the wall by controlling the proportions of *aa* blocks and *ba* blocks in the wall. The contours of blocks such as the *aa* or *ba* blocks may be so oriented in the wall as to admit direct sunlight during specific hours of the day and seasons of the year.

Walls constructed of the molded blocks or panels may be combined with sheets of screen cloth or glass. Where glass is used, passage of air through the wall is cut off, but light is permitted to pass in differing degrees, depending upon the light transmission characteristics of the glass. When used in conjunction with colored glass and back lighting on the interior of the building structure various decorative effects are possible.

In practicing the method of the invention, right triangle molding core units of any of the various types hereinbefore described are positioned in molding frames so as to define a module or plurality of modules and plastic material is molded or cast about the three dimensional surfaces of the molding cores to form moldings having contours which are positive reproductions of the negative surfaces of the core units. In a variation of this method, the module or modules formed by the right triangle molding core units may be pressed into a body of plastic material to form a sculptured effect on the plastic material when it hardens.

It can be seen from the foregoing that there is provided in accordance with this invention a block or panel molding method and apparatus which permits great versatility and flexibility in block or panel configurations and combinations and which permits several basic block forms to be combined in a great number of combinations and configurations. The blocks may be used for constructing load bearing walls or screen walls as desired and may be used to permit controlled passage of light and air through the wall, thus making the blocks particularly suitable for use in tropical and temperate climates.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

A molded block member of rectangular perimeter having a substantially flat base and including a first triangular section lying on one side of the diagonal axis of the block and a second triangular section lying on the opposite side of the diagonal axis, said first triangular section having a saddle shape contoured surface opposite said base and sloping downwardly away from said diagonal axis forming a cornerpost opposite said diagonal axis in said first triangular section, said second triangular section having a saddle shape contoured surface opposite said base sloping downwardly from said diagonal axis and terminating in a corner post diagonally opposite said cornerpost of said first triangular section, said second triangular section further having a passage of substantially semi-elliptical shape extending therethrough in a plane substantially perpendicular to said one base to permit passage of light and air, said first section having a tapered recess extending angularly inwardly from said base thereof for a part of the distance to said contoured surface of said first triangular section, said recess being bounded by and having its shape defined by a surface in said first section tapering inwardly toward the diagonal axis of said block, said recess communicating with said passage of said second section whereby said first passage and said recess together define a composite passage which extends through said block in a plane extending at an angle to the plane of said base.

References Cited by the Examiner

UNITED STATES PATENTS

| | | | |
|---|---|---|---|
| 1,250,855 | 12/1917 | Griffin | 52—264 |
| 1,495,896 | 5/1924 | Ferguson | 52—367 |
| 2,891,397 | 6/1959 | Hauer | 52—650 |
| 3,038,278 | 6/1962 | Hauer | 52—302 |
| 3,047,984 | 8/1962 | Lauro | 52—302 |
| 3,090,163 | 5/1963 | Hauer | 52—663 |

FOREIGN PATENTS

| | | |
|---|---|---|
| 782,754 | 9/1957 | Great Britain. |
| 1,860 | 11/1960 | Great Britain. |

FRANK L. ABBOTT, *Primary Examiner.*

HENRY C. SUTHERLAND, *Examiner.*